United States Patent
Tamaura

Patent Number: 5,093,303
Date of Patent: Mar. 3, 1992

[54] CATALYST FOR DECOMPOSING GASEOUS OXIDE AND METHOD OF MANUFACTURING THE SAME

[76] Inventor: Yutaka Tamaura, 6-11-13-105, Hino, Kounan-ku, Yokohama-shi, Kanagawa-Ken, Japan

[21] Appl. No.: 657,767

[22] Filed: Feb. 21, 1991

Related U.S. Application Data

[63] Continuation-in-part of Ser. No. 616,932, Nov. 21, 1990.

[30] Foreign Application Priority Data

Nov. 28, 1989 [JP] Japan ................... 1-308568
Dec. 29, 1989 [JP] Japan ................... 1-342177
Feb. 16, 1990 [JP] Japan ................... 2-35882
Feb. 21, 1990 [JP] Japan ................... 2-40833

[51] Int. Cl.$^5$ ................... B01J 23/70; C01G 49/02
[52] U.S. Cl. ................... 502/338; 423/632
[58] Field of Search ................... 423/634, 656, 632; 502/338

[56] References Cited

U.S. PATENT DOCUMENTS

| | | | |
|---|---|---|---|
| 2,479,435 | 8/1949 | Vegtendal | 502/338 |
| 2,707,706 | 5/1955 | Bauch | 502/338 |
| 3,696,153 | 10/1972 | Hershaw | 502/338 |
| 3,986,985 | 10/1976 | Dewdney et al. | 502/338 |
| 4,311,684 | 1/1982 | Umeki | 423/564 |
| 4,480,051 | 10/1984 | Wu | 502/338 |
| 4,661,468 | 4/1987 | Lee et al. | 502/338 |
| 4,666,882 | 5/1987 | Okazaki et al. | 502/338 |
| 4,668,658 | 5/1987 | Jennings | 502/338 |

Primary Examiner—Gary P. Straub
Attorney, Agent, or Firm—Kanesaka and Takeuchi

[57] ABSTRACT

An activated magnetite catalyst is formed of activated iron oxide or iron particles with solid crystal lattice, from which oxygen is partly removed. When the activated mgnetite catalyst is prepared, oxygen is partly removed from solid crystal lattice of particles of $Fe_3O_4$, $Fe_3O_{4+x}$ obtained by partly or entirely oxidizing $Fe_3O_4$ or gamma-$Fe_2O_3$. The catalyst is useful to decompose gaseous oxides.

9 Claims, 4 Drawing Sheets

CATALYST FOR DECOMPOSING GASEOUS OXIDE AND METHOD OF MANUFACTURING THE SAME

CROSS-REFERENCE TO RELATED APPLICATION

This is a continuation in part application of Ser. No. 616,932 filed on Nov. 21, 1990.

BACKGROUND OF THE INVENTION

1. Field of the Invention

The present invention relates to a catalyst used for decomposing gaseous oxide, such as air pollution gas, and more particularly, to a catalyst used for cleaning various gases such as $CO_2$ and NOx generated by combustion, which become causes of air pollution.

2. Description of Prior Art

Carbon dioxide gas and nitrogen oxide gas which are great factors of air pollution are derived from exhaust gas produced from factories and automobiles. For example, nitrogen oxide is not only one of factors of causing asthma or cancers in a great rate, but also it has been noticed as warming gas which brings about global warming (green housing), together with carbon dioxide gas. From the viewpoint of peventing the global warming (green housing), therefore, countermeasures of removing nitrogen gas existing in the exhaust gas have been urgently desired.

In order to solve these problems, technology has been studied and researched to reduce the nitrogen oxide in the exhaust gas. The typical method which has been practised at the present time is a dry selection contact reduction process. Except this process, there have been known no-catalyst reduction process, wet direct absorption process and wet oxidization absoprtion process.

The dry selection contact reduction process is one which adds a reductant to an exhaust gas to reduce NOx by means of a catalyst. As the reducing agent, ammonium, hydrocarbon, hydrogen and carbon monoxide are used. The catalyst is selected from noble metals such as Pt or various metal oxides carried on $Al_2O_3$ or $TiO_2$. However, Pt is expensive, so that the actual practice thereof is difficult.

In this point, since $V_2O_5$-$TiO_2$ catalyst having $TiO_2$ as a carrier is used at relatively low temperature and excellent in catalyst activities, it has been practised.

However, even in $V_2O_5$ catalysts, the component V thereof is not cheap and moreover, decomposition efficiency in the catalyst activities can not be satisfied.

On the other hand, the countermeasure to prevent air pollution caused by carbon dioxide gas has been recognized, so that emission control itself has only been studied at the present situation.

With respect to the recent treatment of carbon dioxide gas, recycle system of oxygen and carbon dioxide gas in the universe has been studied as the prevention of air pollution by the carbon dioxide gas is difficult.

Nowaday, plans of space stations have been proceeded on a full scale. In order to correspond to manned commission in the space for a long period, it becomes indispensable to establish technology of recycling gas and oxygen in the space station. From these circumstances, importance of studies for treating carbon dioxide gas has increasingly rised.

As shown in FIG. 4, oxygen-recycling system in the space is formed of a cycle of removal of $CO_2$, reproduction of an adsorbent, reduction of $CO_2$ and production of $O_2$ (electrolyte), in relationship between $O_2$ which a person absorbs and $CO_2$ which he exhausts. As $CO_2$-reduction process in this system, BOSCH system has been researched (Universal Station Lectures published by Nippon Koku Uchu Gakkai (Japan Aeronautics and Space Association), pp. 244-245, 1985). The BOSCH system is a relatively superior method. The reaction in this system is carried out by inserting $H_2$ and $CO_2$ as a mixed gas in the proportion of 2:1 in reaction cells, using steel wool as a catalyst and recycling the gas between the reaction cells.

The reaction is the following.

$$CO_2 + 2H_2 \rightarrow C + 2H_2O$$

However, in the above-mentioned reaction, the following side reactions are produced:

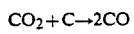

$$CO_2 + C \rightarrow 2CO$$

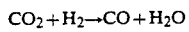

$$CO_2 + H_2 \rightarrow CO + H_2O$$

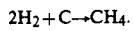

$$2H_2 + C \rightarrow CH_4.$$

As a result, about 20% of CO and about 30% of $CH_4$ are produced. As apparent from this fact, the decomposition rate of carbon is very low. Furthermore, there are such problems of (1) selection of most suitable catalyst, (2) treatment of unreacted product of side production of produced carbon product and separation of outlet water and gas, and (3) security of safety against the use of hydrogen at high temperature.

In the actual treatment, the BOSCH system requires high temperature of from 500° C. to 800° C. in the reaction and higher consumption of thermal energy. When such a high temperature acts on an apparatus for long time, there becomes a problem with respect to the durability of the apparatus and the selection of materials of the apparatus and thus, danger becomes great in a point of dealing with hydrogen gas at high temperature.

The present invention is to solve the above-mentioned problems.

OBJECT AND SUMMARY OF THE INVENTION

An object of the present invention is to provide a catalyst for effectively decomposing carbon dioxide gas, nitrogen oxide gas which become a factor of air pollution.

Another object of the invention is to provide a catalyst, such as activated magnetite for treating said air pollution gas.

Still another object of the invention is to provide a catalyst for treating air pollution gas with two-step treatment of activating iron oxide and of reacting the activated iron oxide with said gas.

Still another object of the invention is to provide a catalyst, which decomposes $CO_2$ produced by astronauts in a space station and can be applied to a system for producing useful $O_2$.

Still another object of the invention is to provide a method of manufacturing the above catalyst.

The other objects of the present invention are clarified by referring the specification and the accompanying drawings.

In the catalyst of the present invention, gaseous oxide is decomposed to a basic component and oxygen. The catalyst is an activtaed iron oxide having a property of oxygen lattice defect on a solid crystal of iron oxide particle. When the gaseous oxide is contacted with the activated iron oxide, the gaseous oxide is decomposed, and the basic component of the gaseous oxide is separated.

The gaseous oxide may be $CO_2$, NOx or SOx. Therefore, causes of air pollution containing $CO_2$, NOx or SOx may be effectively removed.

The iron oxide is activated by contacting with hydrogen gas, subjecting in a vacuum condition or reacting with a reductant.

PREFERRED EMBODIMENT OF THE INVENTION

Activated magnetite catalyst of the present invention is obtained from iron oxide particles as a starting material. The iron oxide particles are $Fe_3O_4$, or gamma-$Fe_2O_3$, wherein oxygen is removed from solid crystal lattice of iron oxide particles. The activated magnetite catalyst of the invention is obtained by partly removing oxygen under 200° to 400° C. from crystal lattice of particles of $Fe_3O_4$, or gamma-$Fe_2O_3$.

The activated magnetite catalyst, i.e. oxygen defect lattice of magnetite ($Fe_3O_{4-x}$), of the invention is obtained as a starting material from $Fe_3O_4$, or gamma-$Fe_2O_3$, from which oxygen is removed. When preparing the activated magnetite catalyst, it is important that oxygen is removed at a temperature between 200° and 400° C.

If the temperature is below 200° C., time elapses excessively to remove oxygen from the lattice, so that it is not practical. If the temperature is above 400° C., the oxygen defect lattice of magnetite is not obtained and alpha-iron is partly formed.

In the past, experiments were conducted at a temperature over 600° C. in view of time. Therefore, oxygen defect lattice of magnetite existing semi-stably at about 600° C. has not been discovered.

In case the treating temperature is in the range of 200° and 400° C., oxygen is removed relatively fast, and also, thus obtained oxygen defect lattice of magnetite can exist stably. An example is shown below, wherein 300° C. is selected, and hydrogen is used for removing oxygen, which is a reaction to form water.

Magnetite particles (0.1–0.2 micron), which is obtained by oxidizing hydroxides of first iron ion at pH 11, is left for four hours at 300° C. in a stream of $H_2$. X-ray diffraction characteristics are measured and are shown in FIG. 6.

Figure 6:
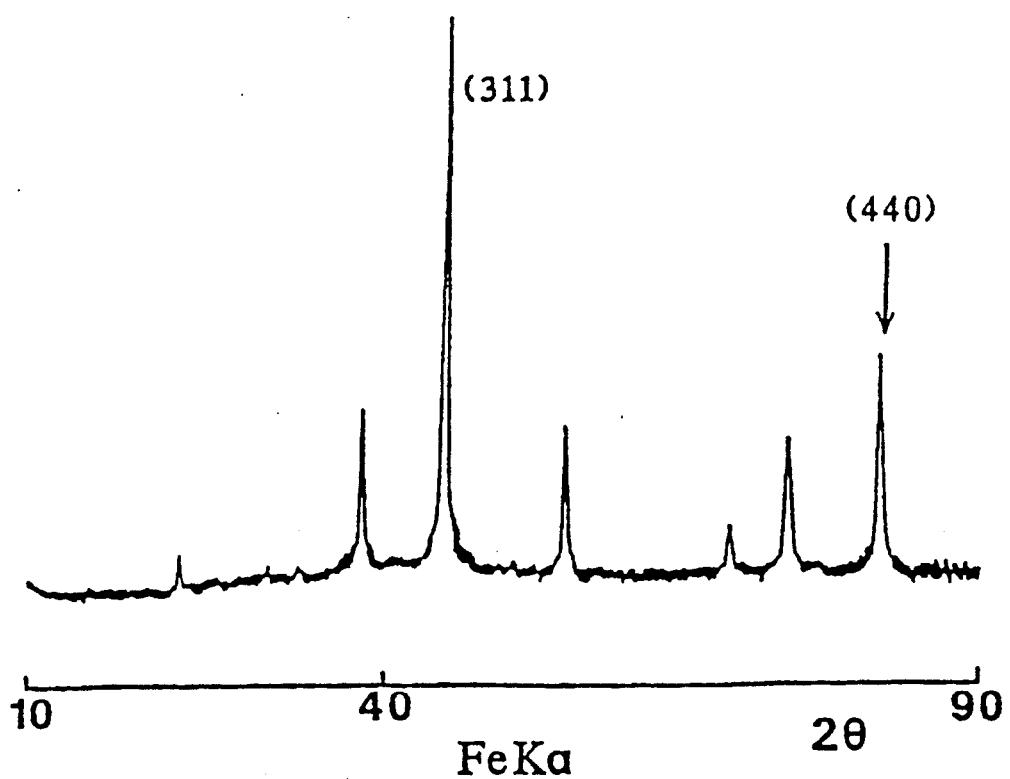
FIG. 6 is an X-ray diffraction characteristics of activated magnetite of the invention.

In FIG. 6, it is shown that there is no phase of alpha-iron and is seen a peak of spinel type composition. Therefore, it is understood that magnetite particles contain spinel structure. The lattice constant of the spinel type composition obtained from the position of the peak (angle) is 0.8408 nm, which is larger than the lattice constant of 0.8396 nm of magnetite $Fe_3O_4$ in chemical volume. Also, chemical structure of the hydrogen treated magnetite is $Fe_3O_{4-x}$ (x=0.25).

Thus, it is assumed that the hydrogen treated magnetite has spinel structure with oxygen defect. This hydrogen treated magnetite is relatively stable in air and under room temperature. However, it is oxidized above 100° C. to become $Fe_3O_4$.

Further, it is clarified that in case hydrogen treated magnetite is left at 400° C. in a stream of nitrogen for three hours, hydrogen treated magnetite is partly changed to alpha-Fe as a result of X-ray diffraction measurement.

Accordingly, the hydrogen treated magnetite of the present invention (oxide defect magnetite) changes to alpha-Fe above 450° C. Namely, the hydrogen treated magnetite is a new material existing stably at about 300° C.

The activiated magnetite has its property to draw $O^{2-}$ ion into $O^{2-}$ defect lattice of magnetite and has reactivity to draw $O^{2-}$ into the lattice in coupling with the reaction where $Fe^{2+}$ ion changes to $Fe^{3+}$.

Namely, the activated magnetite conducts such a reaction that at the same time when oxygen ion is drawn from a chemical substance, the activated magnetite reduces atoms paired with the oxygen ion. By the reaction possessed by the activated magnetite, it can be presumed that $CO_2$ and NOx are decomposed to the following.

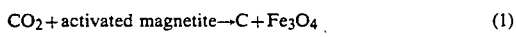

$$CO_2 + \text{activated magnetite} \rightarrow C + Fe_3O_4 \quad (1)$$

$$NO + \text{activated magnetite} \rightarrow Fe_3O_4 + N_2 \quad (2)$$

$$NO_2 + \text{activated magnetite} \rightarrow Fe_3O_4 + N_2 \quad (3)$$

According to the above-mentioned reactions (1) to (3), $CO_2$ is decomposed into C and NOx is decomposed into $N_2$ gas.

$Fe_3O_4$ produced by decomposing $CO_2$ or Nox can be reused again as a catalyst for decomposition.

The reaction proceeds at 270° C. and more. When temperature is lower than 270° C., the reaction speed drops. On the other hand, when temperature is too high, the reduction action tends to overproceed.

This reaction is entirely the same when iron oxides, i.e., ferrite and wustite having the same effects are used. The iron oxide may be used in the form of a particle or sintered body.

When hydrogen is used for the activation treatment of magnetite and when the obtained activated magnetite is applied to the decomposition treatment of $CO_2$, hydrogen can be collected at high decomposition rate of almost 100% by the decomposition treatment of $H_2O$ produced by the activation treatment, so that it can be used to oxygen-collection system in a space station.

In the above, the description is made to the decomposition treatment of $CO_2$ and NOx. In the following examples, treatments of $CO_2$ and NOx are also shown. However, the present invention is not to be limited to these examples and can be applied to the treatment of sulfur oxides SOx which are also air pollution gas, in the entirely same manner.

As explained above, the activated magnetite is an effective catalyst for decomposition treatment of SOx in addition to $CO_2$, NOx. However, the activated magnetite is not limited to the decomposition treatment thereof and can be applied to the decomposition treatment of oxides such as $H_2O$, in which $H_2O$ is decomposed to generate $H_2$.

The following is examples of the present invention.

EXAMPLE 1

Figure 1:
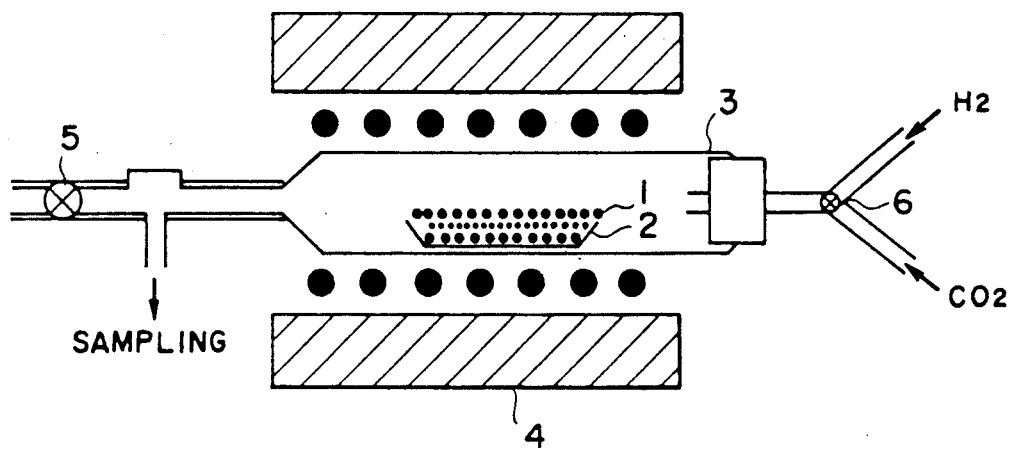
FIG. 1 is a schematic view showing an experimental apparatus used in Example 1 of the present invention.
Figure 2:
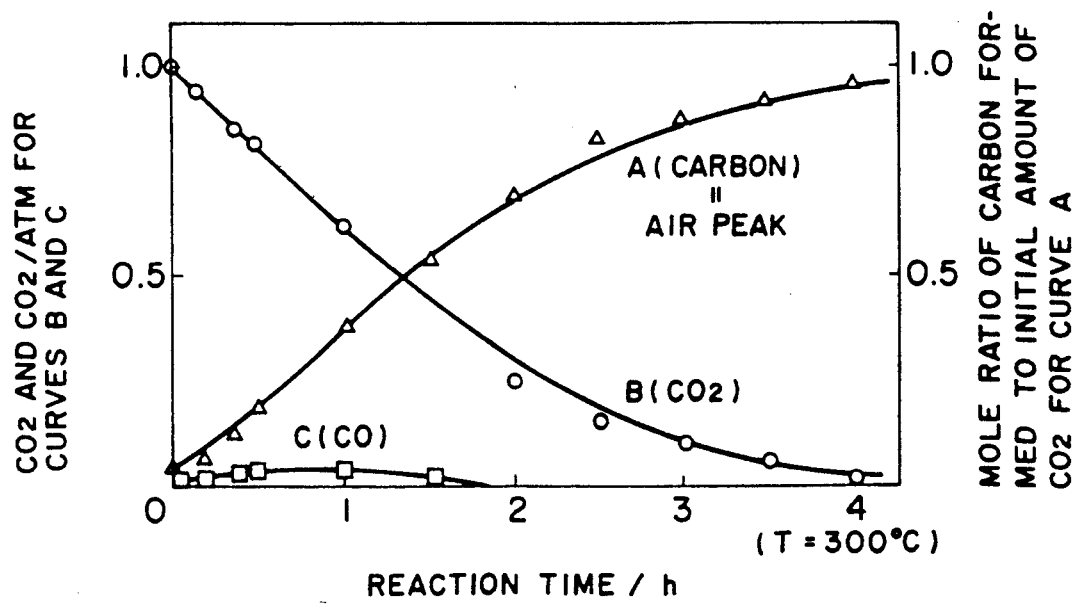
FIG. 2 is a view showing the change of the amount of carbon dioxide gas by the Example 1 of the present invention which uses hydrogen-activated magnetite.

Referring to FIG. 1, 0.9 gr of $Fe_3O_4$ particles 1 was placed in a magnetic board 2. The magnetic board 2 was housed in a reaction tube 3 and an outlet side valve 5 was opened while the reaction tube 3 containing the magentic board 2 was heated in an electric furnace 4 at 300° C. so as to contact magnetite and $H_2$ over the period of five hours. After the $Fe_3O_4$ particles were activated with hydrogen gas, an inlet side valve 6 was switched and 100% $CO_2$ gas was fed. Then, the outlet side valve 5 was closed and kept at 300° C. for five hours. Aging change between the amount of $CO_2$ and the amount of carbons deposited on the $Fe_3O_4$ during the period of five hours was measured. The result thereof is shown in FIG. 2. As apparent from FIG. 2, after four hours passed, $CO_2$ was not almost retained and thus, the decomposition efficiency of almost 100% was obtained.

Although, at the beginning of the reaction, CO was slightly deposited, CO disappeared completely after two hours passed. $CH_4$ was not deposited over the whole reaction period.

Figure 3:
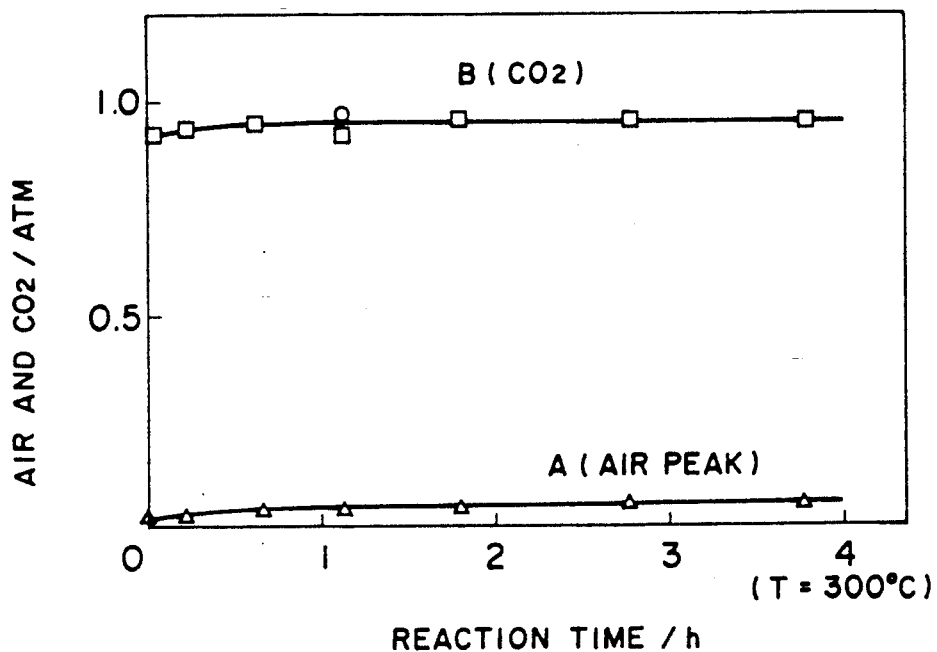
FIG. 3 is a view showing the change of the amount of carbon dioxide gas which is treated by using unactivated magnetite for the purpose of the comparison.
Figure 4:
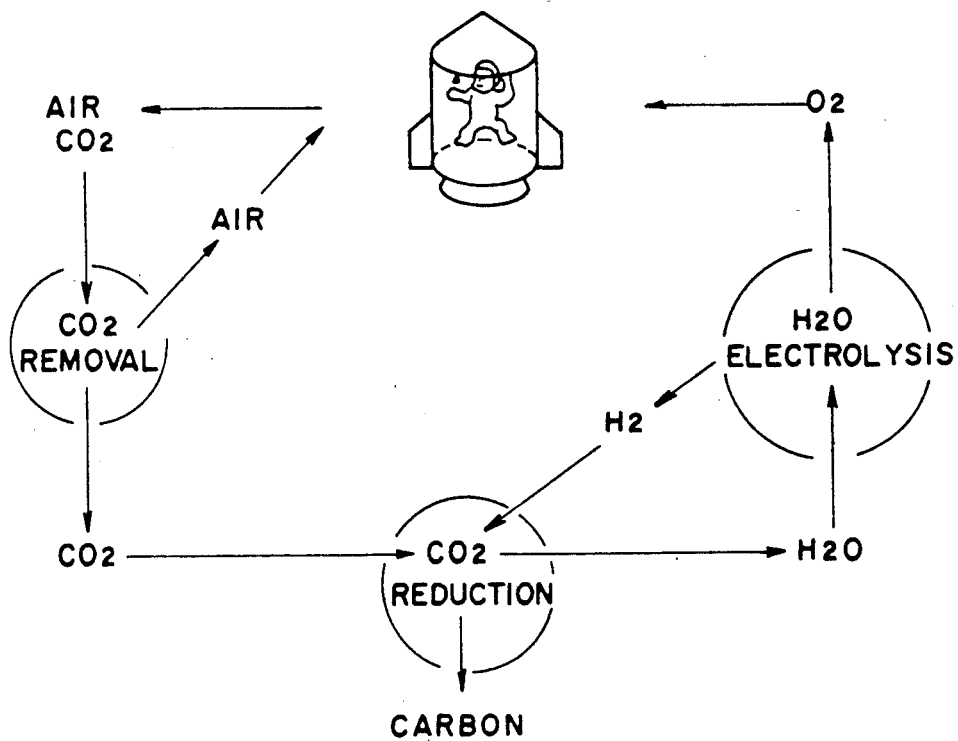
FIG. 4 is a schematic view of oxygen-recycling system.

FIG. 3 shows the result of the similar treatment of $CO_2$ which was conducted by using $Fe_3O_4$ but not dealed with activation. As apparent from FIG. 3, there was almost no change in the amount of $CO_2$ gas over the whole reaction periods. From the comparison of Example 1 and comparative example, it may be understood that to apply the activation treatment to $Fe_3O_4$ particles and to conduct the reaction treatment to $CO_2$ by using the activated $Fe_3O_4$ particles as a catalyst are very important.

EXAMPLE 2

Figure 5:
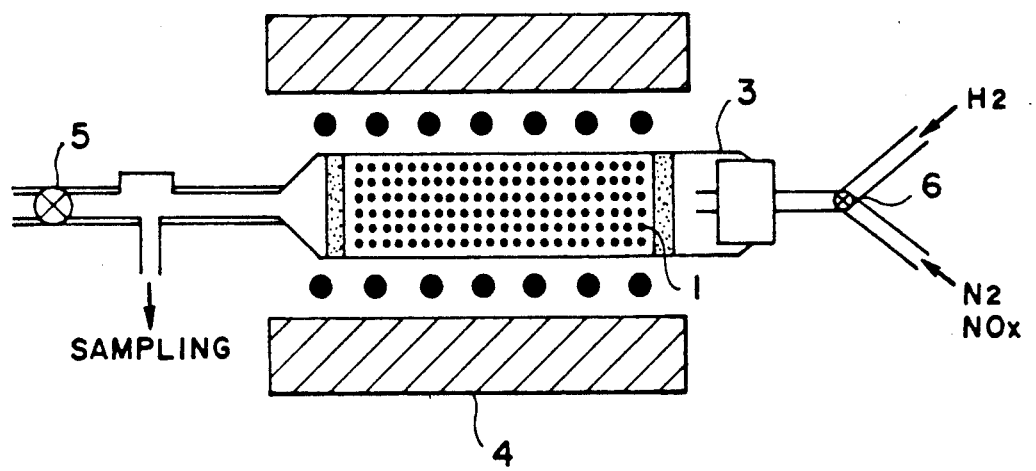
FIG. 5 is a schematic view showing a test apparatus used in Example 2 of the present invention.

In FIG. 5, 3.0 g of $Fe_3O_4$ particles 1 were filled in a reaction tube 3, this reaction tube 3 was heated in an electric furnace 4 at 350° C. and an outlet side valve 5 of the reaction tube 3 was opened. By flowing $H_2$ gas from an inlet side of the reaction tube 3, the contact of the particles 1 with $H_2$ was continued during the period of five hours. After the $Fe_3O_4$ particles 1 was activated with $H_2$, the inlet side valve 6 was switched and $N_2$ gas was fed for one hour to completely remove $H_2$ gas. Next, while the temperature was kept at 350° C., 1000 cc of 921 ppm NOx ($NO+NO_2$) gas (in a standard state) was fed into the reaction tube 3 at 20 cc/min. Gas comming out of the outlet side of the reaction tube 3 was collected and analysis of NOx ($NO+NO_2$) gas concentration was conducted. As a result, NOx ($NO+NO_2$) gas was not detected. This means that NOx ($NO+NO_2$) gas was removed at almost 100% efficiency. For the comparison, the similar experiment was made by exposing unactivated $Fe_3O_4$ to $N_2$ gas. As a result, 921 ppm NOx ($NO+NO_2$) gas was reduced to 450 ppm. As shown above, when $Fe_3O_4$ particles which were not applied to the activation treatment were contacted to NOx ($NO+NO_2$) gas at the temperature of 350° C., it is possible to partly remove NOx ($NO+NO_2$) gas due to the catalyst action. However, when comparing with the complete decomposition of the activated $Fe_3O_4$, the decomposition efficiency of NOx ($NO+NO_2$) gas was remarkably inferior in a case that unactivated $Fe_3O_4$ is used. For the measurement of NOx ($NO+NO_2$) gas, a direct-reading detecting tube for inorganic gases (i. e., for NO and for $NO+NO_2$) and Saltzman reagend method were used.

EXAMPLE 3

The method of the present invention was used to remove NOx ($NO+NO_2$) gas existing in exhaust gas produced from 3 cylinders of a water-cooling type diesel engine (1000 cc in exhaust amount). Namely, when the exhaust gas was directly passed to 100 g of activated $Fe_3O_4$, NOx ($NO+NO_2$) gas was not entirely detected over the period of 30 minutes.

EXAMPLE 4

0.9 g of magnetite powder (0.1 to 0.2 μm) which was obtained by airing ferrous ion at pH 9 to 10 and at 65° C. was put in a magnetic board. The magnetic board was placed in a quartz tube (φ 2 cm and 30 cm in length) and was vaccumed to $10^{-6}$ torr at 300° C. and stayed for three hours so as to activate magnetite. Thereafer, 40 mg of water was poured into the quartz tube to be evaporated and the interior of the tube was kept at about 1 atm. Then, hydrogen gas composite in the tube was measured by gas chromatography. The hydrogen gas was 5% after five minutes passed and increased to 13% after twenty minutes and about 30% after forty minutes, and after about two hours, almost whole water was changed to hydrogen gas.

EXAMPLE 5

0.9 g of magnetite powder was reacted with hydrogen gas for one hour at 300° C. to be activated. Thereafter, hydrogen gas was removed by vacuum pump and decomposed by pouring 40 mg of water in the similar manner to the Example 4. The result was almost the same as that of the Example 4.

As described above, according to the present invention, gases such as $CO_2$ and NOx ($NO+NO_2$) which become a cause of air pollution are subjected to decomposition treatment at their production sources or prior to exhaustion, so that it is possible to prevent diffusion of these gases into the atmosphere. Thus, the present invention can be expected as a technology which can greatly contribute the solution of environmental problems such as global warming, acid rain, pollution-related disease which are caused by the air pollution.

Moreover, the use of the activated magnetite may not be limited to the treatment of air pollution gas, but the activated magnetite may be used for the decomposition treatment of various kinds of oxides, for example, for generating useful hydrogen gas for source of energy gas by decomposing water.

Since magnetite or the like which are used as catalyst material is oxide of iron, it is innoxious and can be obtained in a great deal and there is no fear to cause environmental pollution at all.

Thus, by using the method of the present invention in the system in universe, extremely simple and effective gas-separation system and oxygen-recycle untilization system can be realized.

What is claimed is:

1. A catalyst for removing oxygen from gaseous oxygen compound selected from $CO_2$, NOx, SOx and $H_2O$, comprising an iron oxide having oxygen defect lattice on solid crystal of the iron oxide, said iron oxide having a general formula of $Fe_3O_{4-x}$, wherein x is larger than 0 and less than 1, said catalyst being formed by partly removing oxygen from the solid crystal lattice of the iron oxide selected from the group consisting of $Fe_3O_4$ and gamma-$Fe_2O_3$ with hydrogen gas at a temperature between 200° C. and 400° C., said catalyst, when reacted with the gaseous oxygen compound, removing oxygen from the gaseous oxygen compound and becoming $Fe_3O_4$ without the oxygen defect lattice.

2. A catalyst according to claim 1, wherein said iron oxide is magnetite particles having a size between 0.1 and 0.2 micron.

3. A catalyst according to claim 1, wherein said iron oxide has a spiral structure having lattice constant of 0.8408 nm.

4. A catalyst according to claim 1, wherein said catalyst, (1) when reacted with $CO_2$ at 300° C. for five hours, essentially completely converts $CO_2$ to C and $O_2$ while forming $Fe_3O_4$ without oxygen defect lattice, (2) when reacted with NOx of 921 ppm at 350° C. for 50 minutes, essentially completely converts NOx to N and Ox while forming $Fe_3O_4$ without oxygen defect lattice, and (3) when reacted with 40 mg of water for two hours, essentially completely converts water to hydrogen gas while forming $Fe_3O_4$ without oxygen defect lattice.

5. A catalyst according to claim 1, wherein said catalyst, (1) when reacted with $CO_2$, essentially completely converts $CO_2$ to C and $O_2$ while forming $Fe_3O_4$ without oxygen defect lattice, (2) when reacted with NOx, essentially completely converts NOx to N and Ox while forming $Fe_3O_4$ without oxygen defect lattice, and (3) when reacted with water, essentially completely converts water to hydrogen gas while forming $Fe_3O_4$ without oxygen defect lattice.

6. A method of manufacturing a magnetite catalyst, comprising partly removing oxygen from solid crystal lattice of iron oxide selected from the group consisting of $Fe_3O_4$ and gamma-$Fe_2O_3$ with hydrogen gas at a temperature between 200° C. and 400° C., said magnetite catalyst having oxygen defect lattice on solid crystal of the iron oxide, said magnetite catalyst having a general formula of $Fe_3O_{4-x}$, wherein x is larger than 0 and less than 1, said catalyst, (1) when reacted with $CO_2$ at 300° C. for five hours, essentially completely converting $CO_2$ to C and $O_2$ while forming $Fe_3O_4$ without oxygen defect lattice, (2) when reacted with NOx of 921 ppm at 350° C. for 50 minutes, essentially completely converting NOx to N and Ox while forming $Fe_3O_4$ without oxygen defect lattice, and (3) when reacted with 40 mg of water for two hours, essentially completely converting water to hydrogen gas while forming $Fe_3O_4$ without oxygen defect lattice.

7. A method according to claim 6, wherein said iron oxide are magnetite particles having sizes between 0.1 and 0.2 micron.

8. A method according to claim 6, wherein said iron oxide has a spinel structure having lattice constant of 0.8408 nm.

9. A method according to claim 6, wherein said x is 0.25.

* * * * *